United States Patent [19]
Williams et al.

[11] Patent Number: 5,754,646
[45] Date of Patent: May 19, 1998

[54] METHOD FOR PROTECTING PUBLICLY DISTRIBUTED SOFTWARE

[75] Inventors: Thomas H. Williams; Claude T. Baggett, both of Longmont, Colo.

[73] Assignee: Cable Television Laboratories, Inc., Louisville, Colo.

[21] Appl. No.: 504,117

[22] Filed: Jul. 19, 1995

[51] Int. Cl.$^6$ .................................................. H04L 9/32
[52] U.S. Cl. .................................................. 380/4; 380/25
[58] Field of Search .................................................. 380/4, 25

[56] References Cited

U.S. PATENT DOCUMENTS

| | | | |
|---|---|---|---|
| 4,578,531 | 3/1986 | Everhart et al. | 178/22.08 |
| 4,683,553 | 7/1987 | Mollier | 380/4 |
| 4,819,267 | 4/1989 | Cargile et al. | 380/23 |
| 4,944,008 | 7/1990 | Piosenka et al. | 380/25 X |
| 4,959,861 | 9/1990 | Howlette | 380/4 |
| 5,083,309 | 1/1992 | Beysson | 380/4 |
| 5,166,886 | 11/1992 | Molnar et al. | 380/4 X |
| 5,212,729 | 5/1993 | Schafer | 380/4 |
| 5,222,133 | 6/1993 | Chou et al. | 380/4 |
| 5,222,134 | 6/1993 | Waite et al. | 380/4 |
| 5,276,735 | 1/1994 | Boebert et al. | 380/21 |
| 5,343,524 | 8/1994 | Mu et al. | 380/4 |
| 5,379,342 | 1/1995 | Arnold et al. | 380/4 X |
| 5,400,403 | 3/1995 | Fahn et al. | 380/21 |

FOREIGN PATENT DOCUMENTS 2606185  5/1988  France.

OTHER PUBLICATIONS

Marketing literature for HASP The Professional Software Protection System, Dec. 20, 1994.

"EIA Standard for Conditional Access, Version 2.4 Draft," National Renewable Security Standards Committee (NRSS), Mar. 15, 1995.

Louis C. Guillou, "ABC of Smart Card Technology," © CCETT 92.

David Dolnick, "Digital Game Delivery Systems," *Broadband Systems & Design*, Jun. 1995, pp. 23–24.

*Primary Examiner*—Gilberto Barron, Jr.
*Attorney, Agent, or Firm*—James R. Young

[57] ABSTRACT

A system for protecting software from copying wherein the software to be protected is placed on the computer system in two parts. A first part is stored in non-volatile storage, such as a hard disk or floppy disk within the computer system, and a second part is stored and executed in a "hardware key", which is attached to the computer system. The second part is stored in volatile RAM and will be erased when electrical power is removed from the hardware key, or when the software stops execution. This requires that the second part of the software be reloaded each time the hardware key is powered up. Typically, the second part of the software will be loaded from a network, or from a cable network, thus reloading of the second part into the hardware key is a trivial matter, so long as the user is an active subscriber to the network or cable network.

33 Claims, 6 Drawing Sheets

5,754,646

METHOD FOR PROTECTING PUBLICLY DISTRIBUTED SOFTWARE

FIELD OF THE INVENTION

This invention relates to computer systems and more particularly to preventing use of copied software within such computer systems. Even more particularly, the invention relates to preventing use and copying of software that is publicly distributed, such as through a cable television connection or through a public network.

BACKGROUND OF THE INVENTION

Software copying is a problem that has plagued the software industry from the beginning of the industry. This problem is more severe for computer game software, because of the low cost of game software and because of the distribution methods used for game software. Even though business software is usually priced higher than game software and business software is often distributed in ways that better protect the software from copying, copying is still a significant problem for business software.

Some game software is now distributed via cable television. A special purpose computer system receives the software from a cable television game channel only into volatile storage, that is, storage not capable of storing the game software after electrical power is removed. The game software is captured by the special purpose computer through a data receiver as the software is transmitted over a cable television game channel, and the user plays the game though the special purpose computer system. The game remains within the memory of the special purpose computer system until electrical power is removed, thus the user can play the game until they turn off the special purpose computer. Since the special purpose computer system has no non-volatile memory that is used for storing the game, nor can the special purpose computer memory be accessed by a general purpose computer having non-volatile storage, the game cannot be saved or copied. This allows only users with access to the particular cable game channel(s) to play the game. If the user desires to play a new game, they wait until the new game is transmitted over the cable television game channel, capture the new game and play it as long as desired. If the user discontinues access to the cable television game channel, they can no longer access any games.

This method affords copy protection for the game as well as ensuring adequate revenue for the game supplier. However, it requires the special purpose computer in order to play the game. The method will not work using a general purpose personal computer, such as an IBM compatible personal computer, or an Apple computer, because these types of computers do contain non-volatile storage in the form of floppy and hard disk drives. Using the non-volatile storage, the user could keep the game permanently, or give a copy to others, thus depriving the game supplier of revenue for the game.

Other methods have been tried to protect software. U.S. Pat. No. 4,683,553 issued Jul. 28, 1987 to Mollier, entitled "Method and device for Protecting Software Delivered to a User by a Supplier" appears to use a card containing a validation code necessary to unlock a program and allow the program to execute. The card is needed each time the program is loaded into main memory for execution. The card contains only a validation code used to unscramble portions of the program. Once unscrambled, however, the software resides, unprotected, in the memory system of the computer, thus it is vulnerable to being copied and distributed to users that have not purchased the card.

U.S. Pat. No. 4,819,267 issued Apr. 4, 1989 to Cargile, et al., entitled "Solid State Key for Controlling Access to Computer Systems and to Computer Software and/or for Secure Communications", describes an enabling device that attaches to a computer wherein the device computes a password, that is matched to a password computed by software in the computer. When the two passwords match, the enabling device returns authorization that allows the computer, or a specific piece of software in the computer, to operate.

U.S. Pat. No. 5,222,133 issued Jun. 22, 1993 to Chou, et al., entitled "Method of Protecting computer Software from Unauthorized Execution Using Multiple Keys", uses two keys that have to match in some manner to allow the software to operate. The first key is stored in a hardware enabling device, plugged into an I/O port. The second key is typed in by a user. The software processes the two keys, and allows the software to continue if the keys match.

In both the Cargile and Chou, et al. systems, because the password is a single entity that can be captured as it is sent between these computer and the enabling device, the system is vulnerable to copying. That is, the password can be captured, and a device constructed to always return the "correct password" authorization.

U.S. Pat. No. 5,212,729 issued May 18, 1993 to Schafer, entitled "Computer Data Security Device and Method" provides a hardware device, plugged into the parallel port of a computer, plus a method that encrypts and decrypts data stored on the hard disk. The system installs a patch into the boot block of the hard disk, and this boot patch interacts with stored code in the hardware device. Once the patch is installed, each time the computer boots up, the hardware device supplies a code to the boot program. If the correct code is provided to the boot program, access to the computer's disk is provided. The boot patch installs disk data encryption/decryption software into the computer's disk BIOS routine and thereafter is used at all times to transparently encode/decode partition data identifying the location of the data on the disk. Without the access code stored on the hardware device and proper password, the contents of the disk are unreadable. Both floppy and hard disks may be used with the device. The hardware device is in two parts—a socket device that attaches to the parallel port, and a key device that plugs into the socket device. This device protects all software used in the computer system, thus it is not very effective for use by multiple software vendors, since they would all have to coordinate and use the same key for each customer. It is also very inconvenient for the user of the system, since anyone needing access to their data must have the password.

U.S. Pat. No. 5,222,134 issued Jun. 22, 1993 to Waite, et al., entitled "Secure System for Activating Personal Computer Software at Remote Locations", describes a system wherein a registration program is run by the user after receiving the software. The registration program calls the vendor's registration computer which, after receiving required registration information, downloads an overlay portion of the software which allows the software to run thereafter. Once the overlay portion is downloaded, however, the software may be easily distributed without protection.

U.S. Pat. No. 5,343,524 issued Aug. 30, 1994 to Mu, et al., entitled "Intelligent Security Device", shows the use of a hardware device, containing a microprocessor, attached to a serial port. This device contains some of the software needed to operate the program. The software in the hardware device is encrypted, so that, if copied, it will not function. The program running in the computer system to which the hardware device is attached sends a security code to the hardware device. The hardware device then decrypts its internal software needed to interpret the security code, and decrypts a security code within the hardware device and compares the two codes with the internal software. If everything matches, the hardware device returns ("downloads") some software to the computer system. This software is inserted into the program, which enables operation of the program. Mu, et al. also makes provision for two security codes to be used, one from the software creator, and one that is set by the user to allow only the specific user to operate the program. Mu, et al. asserts that the system is unbreakable, because the software and comparison security code stored in the hardware device are encrypted, and that any attempt to retrieve the software from the hardware device will destroy the encrypted software and security code. Mu, et al. discusses the use of a "local calculation step", and returning the correct answer in this step is necessary to pass the security check. However, once the hardware device returns the needed software to the computer system, the software is vulnerable to copying, since it is completely operable within the memory of the general purpose computer to which the hardware device is attached.

U.S. Pat. No. 5,400,403 issued Mar. 21, 1995 to Fahn, et al., entitled "Abuse-Resistant Object Distribution System and Method", uses a pure software system which encrypts and then distributes the software via any method. Independently of the distribution of the software, an access number is distributed, such as through a retail store. When the user has both the software and the access number, the user's computer system contacts the distribution unit, over a secure distribution channel such as a telephone line, to get permission to decrypt. This permission is in the form of a second key, and when received, the two keys are used to decrypt the software for use. Once decrypted, however, the software is vulnerable to copying.

It is thus apparent that there is a need in the art for an improved method or apparatus which allows software to be distributed by several methods, and prevents the software from being copied after the software is installed into the memory of the computer system. The present invention meets these and other needs in the art.

SUMMARY OF THE INVENTION

It is an aspect of the invention to prevent unauthorized use and copying of publicly distributed software.

It is another aspect to distribute a part of the software using secure means for distribution.

Another aspect is to perform the secure part of the software using a processor in a hardware key that is separate from the processor in a general purpose computer to which the hardware key is attached.

The above and other aspects of the invention are accomplished in a system wherein the software being protected is divided into two parts. A first part is stored in non-volatile storage in the computer system, such as a hard disk or floppy disk, and a second part is always downloaded, through a computer network or cable network, into the memory of a "hardware key", which is attached to the computer system. The second part is erased each time electrical power is removed from the hardware key, since the hardware key ordinarily receives its electrical power from the same electrical power supply as the computer system. The second part may also be erased when the first part completes execution.

For the software to operate, the second part of the software must be reloaded each time the computer system, and thus the hardware key, is powered up. Typically, the second part of the software will be loaded from a computer network, or from a cable network or cable television data carrier, thus reloading of the second part into the hardware key is a simple and fast operation, so long as the user is an active subscriber to the computer network or cable network.

The hardware key executes some or all of the second part of the software when requested by the first part of the software. This may be done, for example, as a subroutine call, or by passing data to the second part and expecting different data in return, such as returning the value of a function or indexing a table to return a value from the table. Because the second part of the software executes in the hardware key, the request sent by the first part and the results returned by the second part may be very complex and thus appear essentially unpredictable to one attempting to copy the hardware key and the second part of the software. This prevents easy duplication of the hardware key functions. Since the two parts of the software execute in two different processors, and the memory containing the second part is not accessible from the computer system, the system prevents copying of usable software from the computer system memory. In addition, different applications or programs would ordinarily use different forms of returned data, because their functions would normally be different, thus the knowledge learned in breaking one program will be of little or no help in breaking a different program.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
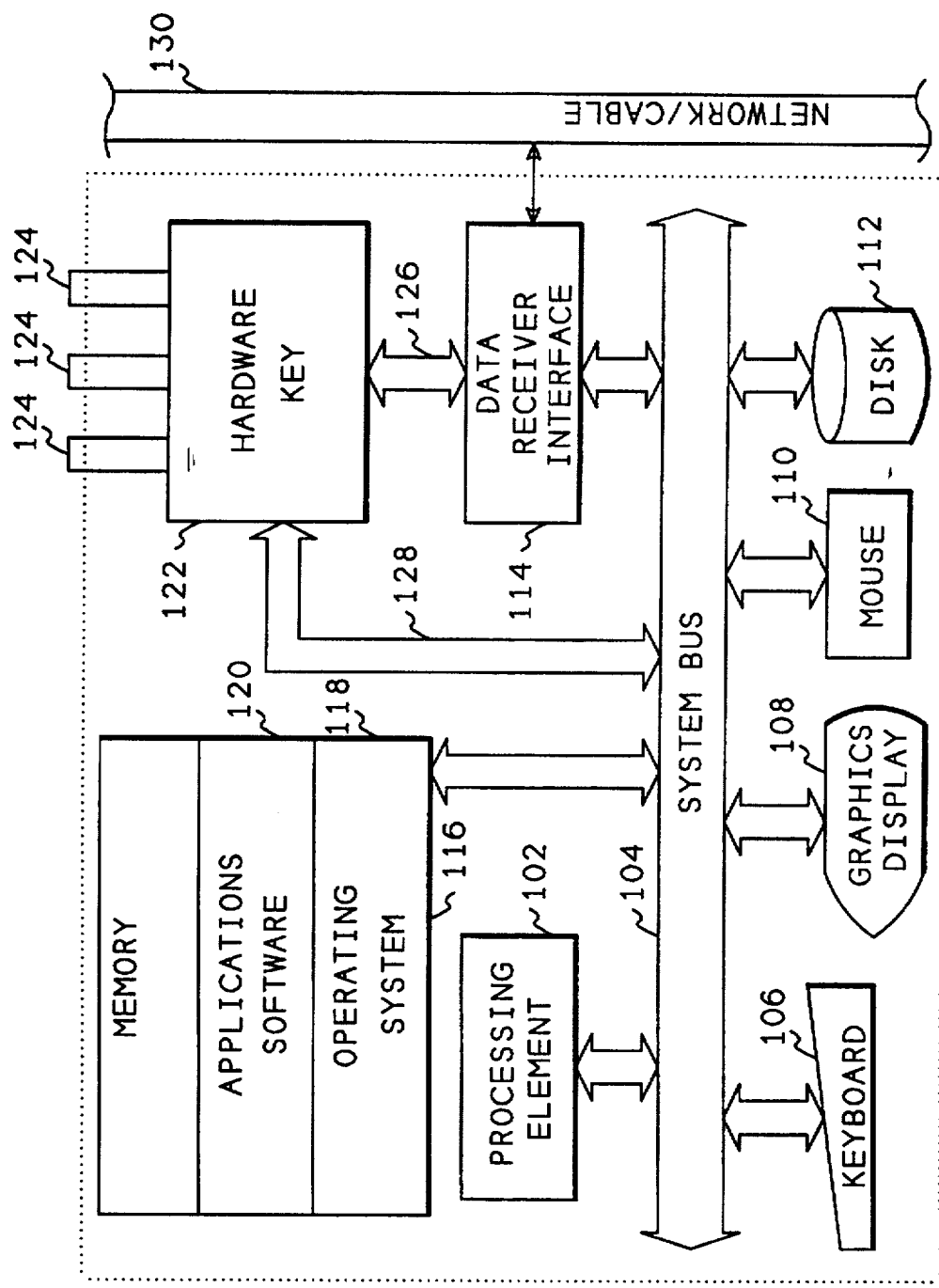
FIG. 1 shows a block diagram of a computer system that incorporates the hardware key and method of the present invention.

FIG. 1 shows a block diagram of a computer system that incorporates the hardware key and method of the present invention. Referring now to FIG. 1, a computer system 100, which is typically a general purpose computer such as a personal computer, contains a processing element 102. The processing element 102 communicates to other elements of the computer system 100 over a system bus 104. A keyboard 106 and a mouse graphical input device 110 allow a user of the system 100 to input data, and a graphics display 108 allows software operating within the computer system 100 to output data or information to a user of the system. A disk 112 stores the first part of the software used with the present invention, and the disk 112 stores any data used in the present invention.

The computer system 100 also contains a memory 116 which stores an operating system 118 and application software 120 of the present invention. Although ordinarily present within general purpose computers, the operating system 118 is not necessary to the present invention.

A data receiver interface 114 is attached to the system bus 104 and also attached to a two-way computer network or one-way cable network 130. This interface is used to receive software from a supplier. When the interface 114 is attached to a cable network, the interface must contain a radio frequency data receiver, since data transmitted over cable television is transmitted at very high frequencies. When the interface 114 is connected to a network cable, the interface must receive data in the form sent over the network. For example, such a network might be an Ethernet, fiber distributed data interface (FDDI), token ring network, etc. or it may be a modulated carrier such as QPSK, 9-PRS, or 64QAM. The type of interface contained within the data receiver interface 114 is unimportant to the invention, so long as the interface is compatible with the signals transmitted on the cable 130.

Also attached to the system bus 104 is a hardware key 122. A more detailed block diagram of this device is shown below with respect to FIG. 2. The hardware key 122 is also connected directly to the data receiver interface 114 through an interface 126. This allows the hardware key 122 to receive data directly from the network 130 without having this data pass through the system bus or any other portion of the computer system 100. The hardware key 122 receives and decodes the secure subroutines used as part of the present invention.

Optionally attached to the hardware key 122 is one or more ISO-7816 compatible cards 124. These ISO-7816 compatible cards conform to the ISO-7816 standard which has the same connector pattern as the national renewable security standard (NRSS) card. When present, the ISO-7816 compatible card or NRSS card provides additional security or renewable security in conjunction with the hardware as part of the present invention.

Figure 2:
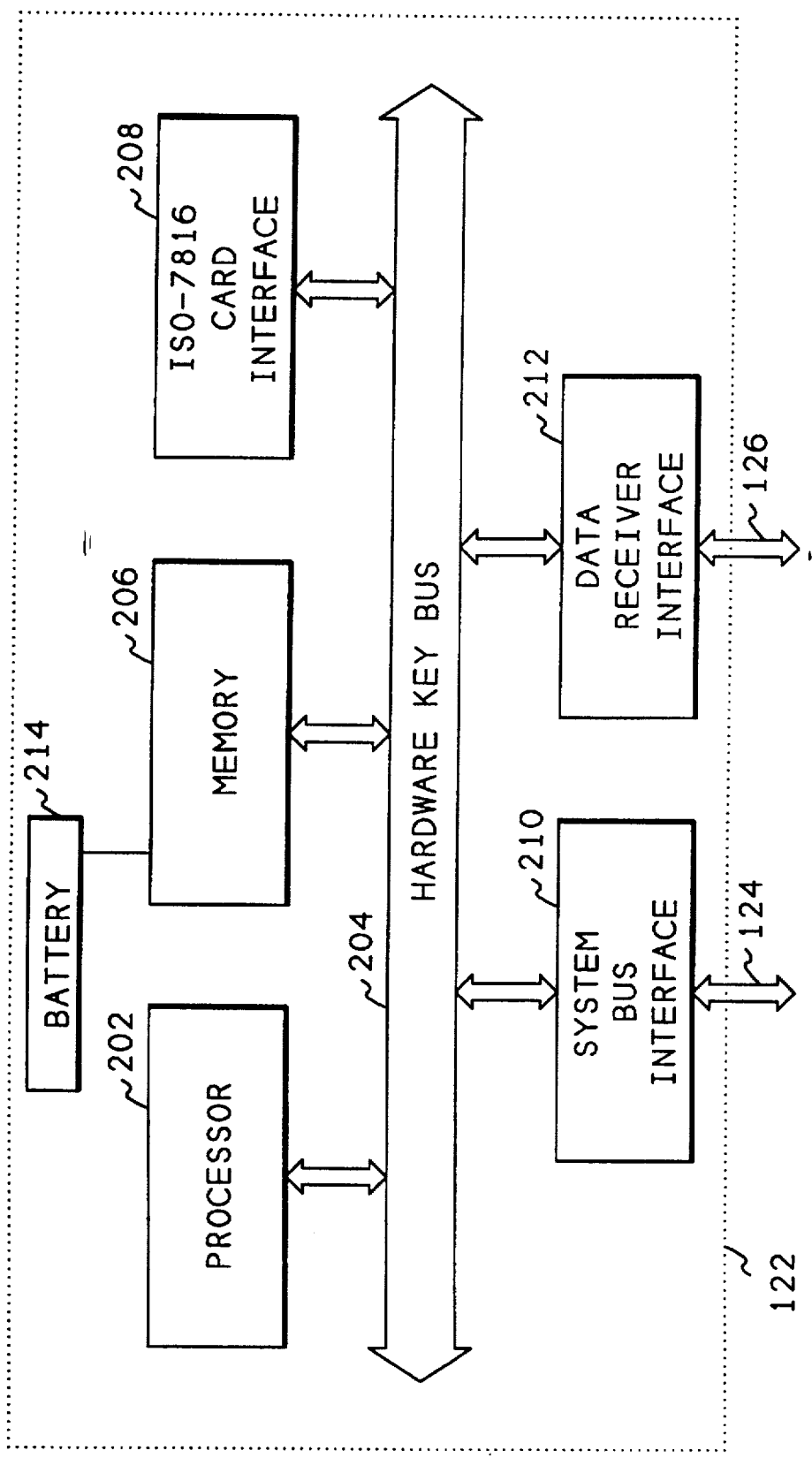
FIG. 2 shows a block diagram of the hardware key electronics of the present invention.

FIG. 2 shows a block diagram of the electronics for the hardware key 122 shown above in FIG. 1. Referring now to FIG. 2, the electronics contained in the hardware key comprise a small computer system. Thus, the hardware key contains a processor 202 which communicates to other elements of the hardware key over a hardware key bus 204. A memory 206 is used to contain the secure subroutines of the present invention. A system bus interface 210 is used to interface the hardware key to the system bus 104 shown above with respect to FIG. 1. A data receiver interface 212 is used to interface the hardware key to the data receiver interface 114 shown above with respect to FIG. 1.

Interface 208 is used to connect the hardware key 122 with one or more ISO-7816 compatible cards 124 as described above with respect to FIG. 1.

The present invention is designed to protect software from copying by having the software delivered in two parts. The first part, which typically comprises the majority of the software, will be delivered through normal distribution channels or alternatively may be broadcast over cable television and received through the data receiver interface 114 and stored on the disk 112 (FIG. 1). Alternatively, the first part of the software can be distributed in any manner, even publicly accessible manners, such as through bulletin boards, or commercial software providers.

In order to use the software, the user must purchase a hardware key, containing a unique address, from a retail store or mail order, and the user must subscribe to a cable network, or other network service, used to distribute the software. The unique address could be in any form, such as a series of letters and numbers that are stored in the hardware key, or they may be derived from the ISO-7816 compatible card(s) plugged into the hardware key 122. The provider of the software insures payment by controlling access to the unique address or the ISO-7816 compatible cards or the network.

Once the first part of the software is stored on the disk 112, and the unique address is provided to the hardware key 122, the hardware key then captures the second part of the software from the network 130 through the data receiver interface 114. Because the second part of the software is captured directly and placed in the memory 206 of the hardware key without ever being transferred into the memory 116 or the hard disk 112 of the computer system 100, the software comprising the second part exists only within the memory 206 of the hardware key 122. Because the memory 206 is not directly addressable from the computer system 100, the second part of the software contained in the memory 206 cannot be copied into the computer system 100, and therefore cannot be copied along with the first part of the software in order to make the entire software available. Ideally, the data destined for memory 206 is encrypted while on the network and is decrypted when received by the hardware key before being stored in the memory 206.

The first and second parts of the software cooperate to accomplish the intended function of the software. This cooperation is accomplished by the first part performing the majority of functions that accomplish the intended operation of the software, however, on occasion the first part will call the second part, for example in the manner of calling a subroutine, to receive data or results necessary to complete the functions of the software. When the second part is called, it operates entirely within the processor contained within the hardware key 122 to produce the result needed by the first part and to send this result back over the interface 128 to the first part of software, that is operating within the memory 116 of the computer system 100. Because the second part of software comprises one or more subroutines, these subroutines would typically perform at least moderately complex functions, so that the data returned over the bus 128 cannot easily be cloned or mimicked by one seeking to pirate the software.

Thus, the software protection is accomplished by dividing the software into two parts, having one of those parts exist entirely within the hardware key 122, and having the functions performed by this second part be too complex to be easily duplicated.

Because the hardware key is a small computer system, it will have control software that is used to control communication between the hardware key and the processor 102, and between the hardware key and the data receiver interface 114. Typically, this control software will be contained in a Read Only Memory (ROM) device within memory 206. Alternatively, the control software may be contained within a volatile part of memory 206 that is powered by a battery 214. Thus, if the user attempts to tamper with the hardware key by disassembling it, the battery will be removed and the control software erased.

Figure 3:
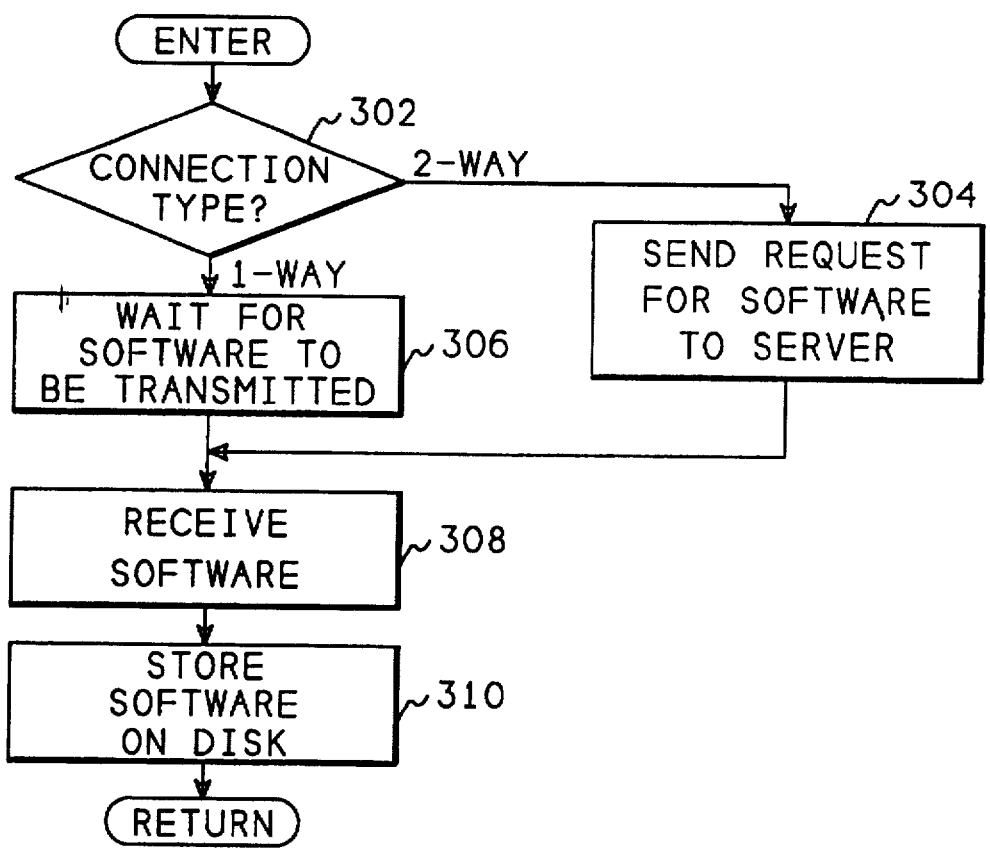
FIG. 3 shows a flowchart of the software used to capture the publicly distributed software.

FIGS. 3–7 show flowcharts of the functioning of the software. FIG. 3 shows a flowchart of software operating within the computer system 100 that is used to capture the publicly distributed first part of the application software. Referring now to FIG. 3, after being invoked through a command supplied by the user, control enters FIG. 3 at block 302 which determines whether the data receiver interface 114 is connected to a 1-way or to a 2-way network. If connected to a 2-way network, such as a computer network, block 302 transfers to block 304 which sends a request over the network to have a server device send the software to the computer system 100.

If the connection is to a 1-way network, such as a cable network, block 302 connects to block 306 which monitors the network through the data receiver interface 114 to determine when the first part of the software is being transmitted. Typically, the first part of the software would be transmitted over the cable network at infrequent intervals, perhaps only once every ten minutes. Thus, a user wishing to first utilize the software must wait perhaps as long as ten minutes for the software to arrive. However, since this software is subsequently stored on the disk 112, this wait only occurs the very first time the user uses the application software.

After sending the request to the network server, or after waiting until the software is transmitted over the network, control goes to block 308 which receives the software through the data receiver interface 114. Block 310 then stores the first part of the software onto the disk 112 for subsequent use.

Alternatively, the flowchart of FIG. 3 can be eliminated entirely by obtaining the first part of the software through retail outlets or other public distribution systems. For example, the first part of the software might be freely distributed on a CD-ROM along with many other programs, since the first part is inoperable without the hardware key obtaining the second part.

Figure 4:
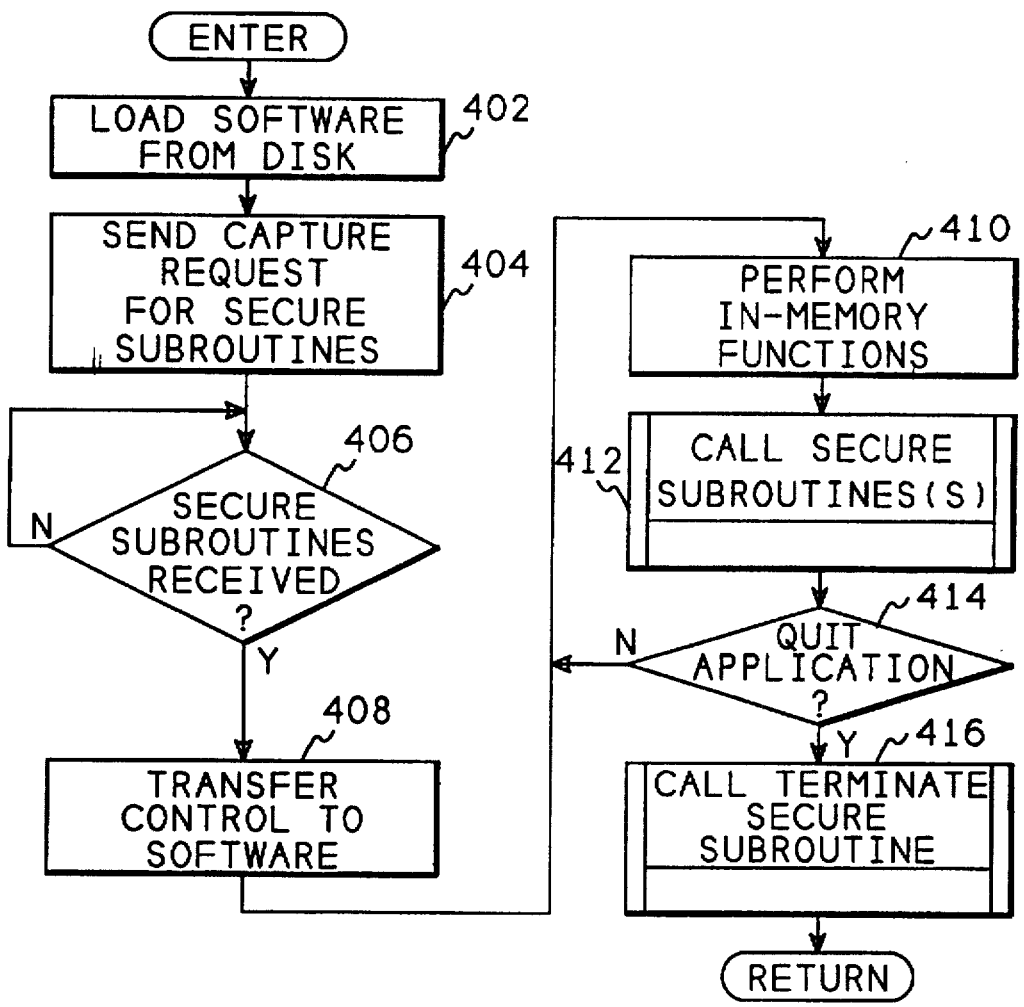
FIG. 4 shows a flowchart of the method for performing the software.

FIG. 4 shows a flowchart of the method for running the application software. Referring now to FIG. 4, the software of FIG. 4 is executed by the user entering a command through the keyboard 106 or by clicking an icon using the mouse 110. After entry, block 402 loads the application software from the disk 112 where it was stored using the process of FIG. 3. Alternatively, the first part could be loaded directly from the network at this time.

Once the software is loaded, block 404 sends a capture request for the secure subroutines to the hardware key 122. Block 406 waits until the secure subroutines have been received, and optionally decoded or decrypted, and then block 408 transfers control to the application software. Once the application software starts, block 410 performs all the functions of the software that are resident in the first part, and then block 412 calls any secure subroutines that have been received by the hardware key.

Each set of application software may be different in how it uses the secure subroutines. The first part of the software may contain all the software with the exception of a single secure subroutine, or many secure subroutines may be used from various locations within the first part of the software. Typically, the software would be designed such that the second part, containing the secure subroutines, performs moderately complex functions which are not easy to duplicate. This would prevent the substitution of unauthorized hardware in place of the hardware key 122.

Block 414 then determines whether the software is complete and if not, returns to block 410. The loop comprising blocks 410, 412 and 414 continue so long as the user is using the application software. Once the user terminates the use of the application software, block 414 transfers to block 416 which calls a terminate secure subroutine within the hardware key 122 to terminate use of the program and erase the second part of the software contained in the memory 206 of the hardware key 122.

Alternatively, block 416 can be eliminated such that the secure subroutines remain in the hardware key 122 until electrical power is removed from the hardware key 122, which would typically be done by removing electrical power from the entire computer system 100.

Figure 5:
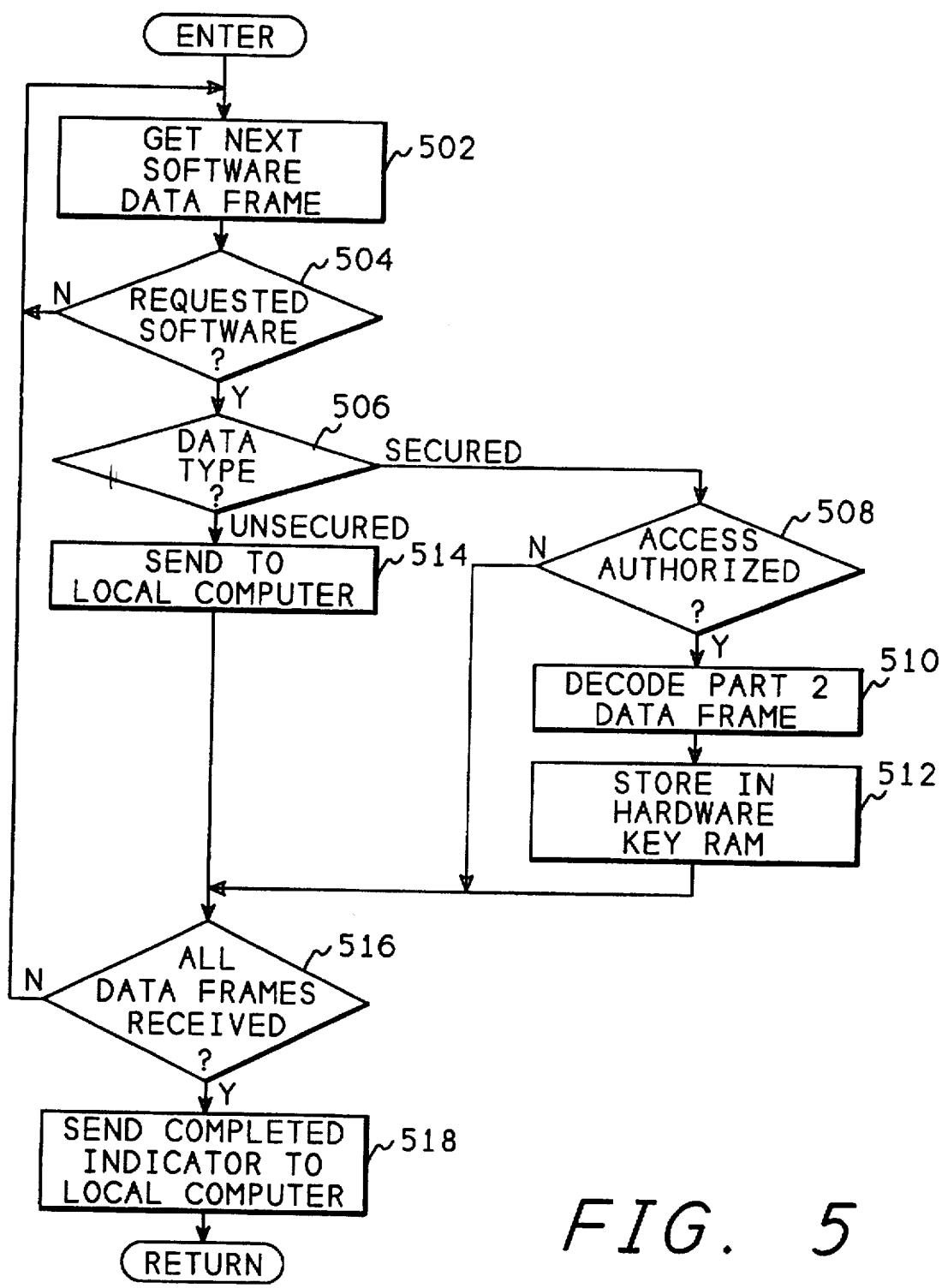
FIG. 5 shows a flowchart of the method of capturing the software and decoding the secured parts of the software.

FIG. 5 shows a flowchart of the method of capturing the software and decoding the secured parts of the software. This method operates in the hardware key 122. The method of FIG. 5 is called by block 308 of FIG. 3 and also by block 404 of FIG. 4. Referring now to FIG. 5, after entry, block 502 gets the next software data frame from the data receiver interface 114. This may require a waiting period, since in the case of a cable network, the parts for many different application software programs will be transmitted one after another. Typically the unsecure, first parts, of various programs would be transmitted infrequently, however, the secure, part two, software for any individual program would typically be transmitted every few seconds.

Once the software data frame is received, control goes to block 504 which determines whether the frame received is for the requested software and if not, block 504 transfers back to block 502 to get the next software data frame. If the software data frame does contain the requested software, block 504 transfers to block 506 which determines the data type. If the data frame contains unsecured data, for part one of the software, block 506 transfers to block 514 which transfers the data block to the local computer 100 over the interface 128. This section of the software will not need to be performed if part one of the software is already stored within the computer system.

If the data frame received is secured data, for part two of the software, block 506 transfers to block 508 which determines whether the access to this secure data frame is authorized. The access will be authorized if the user has supplied the correct access code for this particular application software program. If the access is authorized, which may be automatic through access to the cable channel, block 508 transfers to block 510 which decodes the data frame and then block 512 stores the data in the hardware key memory 206. The software decoding of block 510 may include decrypting the software.

Alternatively, the decision of block 506 may be based solely on whether part one or part two of the software is being received. Although part two of the software would normally be secured, there is no requirement that part two be secured while being sent to the computer system.

After storing the data in the hardware key memory, or if the access was not authorized, or after sending the data to the local computer in the case of a part one data frame, control goes to block 516 which determines whether all data frames have been received and if not, block 516 transfers back to block 502 to get the next software data frame. After all data frames have been received, block 516 transfers to block 518 which sends a completed indicator to the local computer to indicate that the software has all been received.

Figure 6:
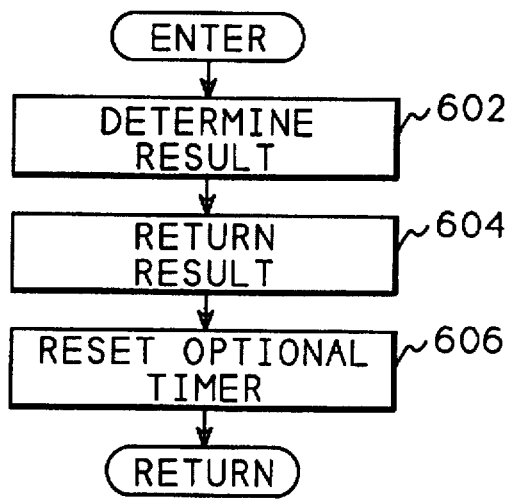
FIG. 6 shows a flowchart of the method of performing the part two subroutines.

FIG. 6 shows a flowchart of the method of performing the secured subroutines. Referring now to FIG. 6, when the secured subroutine is called by sending a message over the interface 128 to the hardware key 122, control enters at block 602 which performs the desired function as requested by the first part of the software. Block 604 then returns the result to the first part of the software and block 606 resets an optional timer, which may be used to determine whether the first part of the software is continuing to operate.

Figure 7:
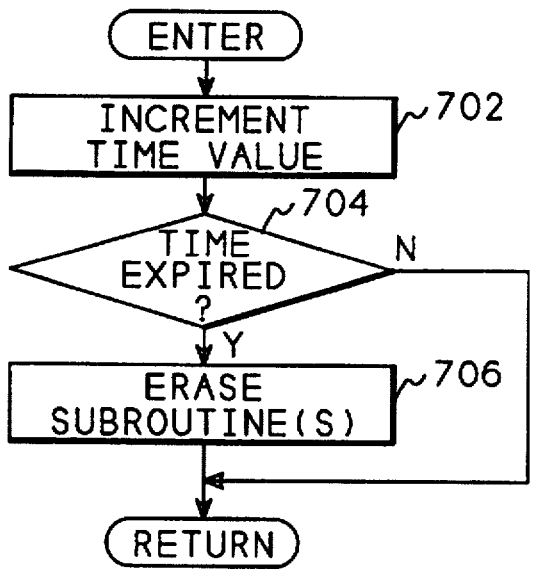
FIG. 7 shows a flowchart of the method of monitoring the execution of the software.

FIG. 7 shows a flowchart of the method of monitoring the execution of the software within the hardware key 122. As discussed above with respect to FIG. 6, each time a secured subroutine is called, a timer may be reset. Expiration of the timer indicates that the first part of the software is no longer operating within the memory 116 of the computer system 100. In this case, the hardware key erases the secured subroutines from the memory 206.

Referring now to FIG. 7. FIG. 7 is entered each time a clock tick occurs within the hardware key internal clock. After entry, block 702 increments a time value and block 704 determines whether the time has expired. If the time has not expired, block 704 returns, doing nothing else. If the time has expired, however, block 704 transfers to block 706 which erases the secured subroutines from the memory 206 of the hardware key 122.

Other timer methods could be incremented such that the timing is done in hardware rather than software and the timer interrupt would then occur only after the timer had expired.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A system for protecting computer software from unauthorized execution within a computer system, the system comprising:

a memory within the computer system for containing a first part of the computer software;

a hardware key attached to the computer system, the hardware key for containing and executing a second part of the computer software;

a processor for executing the first part of the computer software and for communicating to the hardware key to cause execution of the second part of the computer software within the hardware key, when the execution of the second part of the computer software is requested by the first part of the computer software; and a data receiver attached to the computer system and further attached to a transmission facility, the data receiver for receiving the second part of the computer software and storing the second part of the computer software into the hardware key.

2. The system of claim 1 further comprising a connection between the hardware key and the data receiver, and wherein the hardware key will only receive the second part of the computer software through the connection.

3. The system of claim 2 wherein the first part of the computer software causes the data receiver to receive the second part of the computer software.

4. A system for protecting computer software from unauthorized execution within a computer system, the system comprising:

a memory within the computer system for containing a first part of the computer software;

a hardware key attached to the computer system, the hardware key for containing and executing a second part of the computer software wherein the second part of the computer software is decoded by the hardware key before execution of the second part of the computer software;

a processor for executing the first part of the computer software and for communicating to the hardware key to cause execution of the second part of the computer software within the hardware key, when the execution of the second part of the computer software is requested by the first part of the computer software.

5. The system of claim 4 wherein the hardware key further comprises a decoding device connected to the hardware key, wherein the decoding device decodes the second part of the computer software before execution of second part of the computer software in the hardware key.

6. The system of claim 1 wherein the second part of the computer software comprises at least one subroutine.

7. A system for protecting computer software from unauthorized execution within a computer system, the system comprising:

a memory within the computer system for containing a first part of the computer software;

a hardware key attached to the computer system, the hardware key for containing and executing a second part of the computer software wherein memory within the hardware key comprises only volatile memory for storing the second part of the computer software, wherein contents of the volatile memory are erased upon removing electrical power from the hardware key;

a processor for executing the first part of the computer software and for communicating to the hardware key to cause execution of the second part of the computer software within the hardware key, when the execution of the second part of the computer software is requested by the first part of the computer software.

8. A system for protecting computer software from unauthorized execution within a computer system, the system comprising:

a memory within the computer system for containing a first part of the computer software;

a hardware key attached to the computer system, the hardware key for containing and executing a second part of the computer software wherein the second part of the computer software comprises machine instructions for erasing the second part of the computer software when the hardware key has not received communications from the computer system within a predetermined amount of time;

a processor for executing the first part of the computer software and for communicating to the hardware key to cause execution of the second part of the computer software within the hardware key, when the execution of the second part of the computer software is requested by the first part of the computer software.

9. A system for protecting computer software from unauthorized execution within a computer system, the system comprising:

a memory within the computer system for containing a first part of the computer software;

a hardware key attached to the computer system, the hardware key for containing and executing a second part of the computer software wherein the hardware key further comprises a battery powered portion of volatile memory wherein the battery powered portion of memory contains control software;

a processor for executing the first part of the computer software and for communicating to the hardware key to cause execution of the second part of the computer software within the hardware key, when the execution of the second part of the computer software is requested by the first part of the computer software.

10. A method for protecting computer software from unauthorized execution within a computer system, the method comprising the steps of:

(a) dividing the computer software into two parts;

(b) storing a first part of the computer software into a memory within the computer system;

(c) receiving a second part of the computer software only from a transmission facility attached to the computer system and storing the second part of the computer software into a hardware key attached to the computer system;

(d) executing the first part of the computer software in a processor contained in the computer system, wherein the first part of the computer software communicates to the hardware key to cause execution of the second part of the computer software within the hardware key device to provide results needed for operation of the first part of the computer software.

11. The method of claim 10 wherein step (c1) further comprises the step of decoding the second part of the computer software before storing the second part of the computer software into the hardware key processor device.

12. The method of claim 11 further comprising the step of performing the decoding within a decoding device attached to the hardware key processor device.

13. The method of claim 10 wherein step (c) is performed as a part of step (d) and is performed when the first part of the software is executed.

14. A method for protecting computer software from unauthorized execution within a computer system, the method comprising the steps of:

(a) dividing the computer software into two parts;

(b storing a first part of the computer software into a memory within the computer system;

(c) storing a second part of the computer software into a hardware key attached to the computer system;

(d) executing the first part of the computer software in a processor contained in the computer system, wherein the first part of the computer software communicates to the hardware key to cause execution of the second part of the computer software within the hardware key device to provide results needed for operation of the first part of the computer software; and (e) erasing the second part of the computer software when the second part of the computer software has not received communications from the first part of the computer software within a predetermined amount of time.

15. A method for protecting computer software from unauthorized execution within a computer system, the method comprising the steps of:

(a) dividing the computer software into two parts;

(b) storing a first part of the computer software into a memory within the computer system;

(c) storing a second part of the computer software into a hardware key attached to the computer system;

(d) executing the first part of the computer software in a processor contained in the computer system, wherein the first part of the computer software communicates to the hardware key to cause execution of the second part of the computer software within the hardware key device to provide results needed for operation of the first part of the computer software; and (e) erasing the second part of the software from the hardware key upon termination of the first part of the software.

16. A method for protecting computer software from unauthorized execution within a computer system, the method comprising the steps of:

(a) dividing the computer software into two parts;

(b) receiving a first part of the software from a transmission facility;

(c) storing the first part of the computer software into a memory within the computer system;

(d) storing a second part of the computer software into a hardware key attached to the computer system; and (e) executing the first part of the computer software in a processor contained in the computer system, wherein the first part of the computer software communicates to the hardware key to cause execution of the second part of the computer software within the hardware key device to provide results needed for operation of the first part of the computer software.

17. The method of claim 10 wherein the following step (b1) is performed prior to step (b):

(b1) copying the first part of the software from a distribution media read by a removable media storage device of the computer system.

18. A system for protecting computer software from unauthorized execution within a computer system, the system comprising:

memory means within the computer system for containing a first part of the computer software;

hardware key means attached to the computer system, the hardware key means for containing and executing a second part of the computer software;

processor means for executing the first part of the computer software and for communicating to the hardware key means to cause execution of the second part of the computer software within the hardware key means, when the execution of the second part of the computer software is requested by the first part of the computer software; and data receiver means attached to the computer system and further attached to a transmission facility means, the data receiving means for receiving the second part of the computer software from the transmission facility means and storing the second part of the computer software into the hardware key means.

19. The system of claim 18 further comprising connection means between the hardware key means and the data receiver means, wherein the hardware key means will only receive the second part of the computer software through the connection means.

20. The system of claim 19 wherein execution of the first part of the computer software causes the data receiver means to receive the second part of the computer software.

21. A system for protecting computer software from unauthorized execution within a computer system, the system comprising:

memory means within the computer system for containing a first part of the computer software;

hardware key means attached to the computer system, the hardware key means for containing and executing a second part of the computer software wherein the second part of the computer software is decoded by the hardware key means before execution of the second part of the computer software; and processor means for executing the first part of the computer software and for communicating to the hardware key means to cause execution of the second part of the computer software within the hardware key means, when the execution of the second part of the computer software is requested by the first part of the computer software.

22. The system of claim 21 wherein the hardware key means further comprises a decoding means connected to the hardware key means, wherein the decoding means decodes the second part of the computer software before execution of second part of the computer software in the hardware key means.

23. The system of claim 18 wherein the second part of the computer software comprises at least one subroutine.

24. A system for protecting computer software from unauthorized execution within a computer system, the system comprising:

memory means within the computer system for containing a first part of the computer software;

hardware key means attached to the computer system, the hardware key means for containing and executing a second part of the computer software wherein memory means within the hardware key means comprises only volatile memory means for storing the second part of the computer software, wherein contents of the volatile memory means are erased upon removing electrical power from the hardware key means; and processor means for executing the first part of the computer software and for communicating to the hardware key means to cause execution of the second part of the computer software within the hardware key means, when the execution of the second part of the computer software is requested by the first part of the computer software.

25. A system for protecting computer software from unauthorized execution within a computer system, the system comprising:

memory means within the computer system for containing a first part of the computer software;

hardware key means attached to the computer system, the hardware key means for containing and executing a second part of the computer software wherein the second part of the computer software comprises machine instructions for erasing the second part of the computer software when the second part of the computer software has not received communications from the first part of the computer software within a predetermined amount of time; and processor means for executing the first part of the computer software and for communicating to the hardware key means to cause execution of the second part of the computer software within the hardware key means, when the execution of the second part of the computer software is requested by the first part of the computer software.

26. A system for protecting computer software from unauthorized execution within a computer system, the system comprising:

a memory within the computer system for containing a first part of the computer software;

a data receiver attached to the computer system and further attached to a transmission facility;

a hardware key attached to the computer system and further attached to the data receiver, the hardware key for receiving a second part of the computer software from the data receiver, containing the second part of the computer software and executing the second part of the computer software, and wherein the second part of the computer software passes from the data receiver to the hardware key without passing through the memory within the computer system;

a processor for executing the first part of the computer software contained within the memory and for communicating to the hardware key to cause execution of the second part of the computer software within the hardware key, when the execution of the second part of the computer software is requested by the first part of the computer software.

27. The system of claim 26 wherein the first part of the computer software causes the data receiver to receive the second part of the computer software.

28. The system of claim 26 wherein the second part of the computer software is decoded by the hardware key before execution of the second part of the computer software.

29. The system of claim 28 wherein the hardware key further comprises a decoding device connected to the hardware key, wherein the decoding device decodes the second part of the computer software before execution of second part of the computer software in the hardware key.

30. The system of claim 26 wherein the second part of the computer software comprises at least one subroutine.

31. The system of claim 26 wherein memory within the hardware key comprises only volatile memory for storing the second part of the computer software, wherein contents of the volatile memory are erased upon removing electrical power from the hardware key.

32. The system of claim 26 wherein the second part of the computer software comprises machine instructions for erasing the second part of the computer software when the hardware key has not received communications from the computer system within a predetermined amount of time.

33. The system of claim 26 wherein the hardware key further comprises a battery powered portion of memory wherein the battery powered portion of memory contains control software.

* * * * *